United States Patent
Park et al.

(10) Patent No.: US 11,592,412 B2
(45) Date of Patent: Feb. 28, 2023

(54) HIGH-PERFORMANCE MULTILAYER FILM FOR PACKAGING

(71) Applicant: Samsung Electronics Co., Ltd., Gyeonggi-do (KR)

(72) Inventors: Jang-pyo Park, Gyeonggi-do (KR); Yong-won Jeong, Seoul (KR); Jae-hong Kim, Incheon (KR); Sang-hun Lee, Gyeonggi-do (KR); Jeong-eun Lee, Gyeonggi-do (KR); Hye-jung Cho, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 219 days.

(21) Appl. No.: 16/763,891

(22) PCT Filed: Jul. 27, 2018

(86) PCT No.: PCT/KR2018/008575
§ 371 (c)(1),
(2) Date: May 13, 2020

(87) PCT Pub. No.: WO2019/135459
PCT Pub. Date: Jul. 11, 2019

(65) Prior Publication Data
US 2020/0340937 A1    Oct. 29, 2020

(30) Foreign Application Priority Data
Jan. 2, 2018    (KR) .......... 10-2018-0000081

(51) Int. Cl.
*G01N 27/12*    (2006.01)
*F24F 11/30*    (2018.01)

(52) U.S. Cl.
CPC .......... *G01N 27/12* (2013.01); *F24F 11/30* (2018.01)

(58) Field of Classification Search
CPC .................. G01N 27/12; F24F 11/30
See application file for complete search history.

(56) References Cited

U.S. PATENT DOCUMENTS

| | | | |
|---|---|---|---|
| 5,019,885 A | 5/1991 | Yagawara et al. | |
| 5,937,942 A * | 8/1999 | Bias .................. | G05D 23/1904 165/265 |

(Continued)

FOREIGN PATENT DOCUMENTS

| | | |
|---|---|---|
| EP | 3 144 669 | 3/2017 |
| JP | 2011149754 | 8/2011 |

(Continued)

OTHER PUBLICATIONS

European Search Report dated Feb. 3, 2021 issued in counterpart application No. 18898748.1-1020, 7 pages.

(Continued)

*Primary Examiner* — Natalie Huls
*Assistant Examiner* — Sharad Timilsina
(74) *Attorney, Agent, or Firm* — The Farrell Law Firm, P.C.

(57) ABSTRACT

An electronic device is disclosed. The electronic device comprises: a gas sensor having different sensitivities in temperature for each of a plurality of gases; and a processor for calculating a concentration of at least one of a plurality of gases on the basis of an output value of the gas sensor for different temperature sections.

10 Claims, 19 Drawing Sheets

(56) References Cited

U.S. PATENT DOCUMENTS

| | | | |
|---|---|---|---|
| 7,460,958 B2 | 12/2008 | Walsh et al. | |
| 8,186,201 B2 | 5/2012 | Petrovic | |
| 2002/0092341 A1* | 7/2002 | Cardinale | G01N 27/12 |
| | | | 73/25.01 |
| 2008/0052010 A1 | 2/2008 | Lee et al. | |
| 2009/0084160 A1* | 4/2009 | Bristol | G01D 11/245 |
| | | | 156/60 |
| 2014/0216129 A1 | 8/2014 | Schmidlin et al. | |
| 2016/0290946 A1* | 10/2016 | Montanya Silvestre | |
| | | | G01N 27/128 |
| 2017/0023520 A1* | 1/2017 | Chey | G01N 27/4141 |
| 2017/0184556 A1 | 6/2017 | Toffol et al. | |
| 2017/0199159 A1 | 7/2017 | Kuroki et al. | |
| 2017/0370605 A1* | 12/2017 | Makino | F24F 11/77 |

FOREIGN PATENT DOCUMENTS

| | | |
|---|---|---|
| JP | 2013061227 | 4/2013 |
| KR | 100315313 | 11/2001 |
| KR | 100736831 | 7/2007 |
| KR | 100795227 | 1/2008 |
| KR | 101656253 | 9/2016 |
| KR | 1020160109024 | 9/2016 |
| KR | 101695596 | 1/2017 |
| KR | 1020170031809 | 3/2017 |
| WO | WO 2017/046321 | 3/2017 |

OTHER PUBLICATIONS

PCT/ISA/210 Search Report issued on PCT/KR2018/008575, pp. 5.
PCT/ISA/237 Written Opinion issued on PCT/KR2018/008575, pp. 9.
Korean Office Action dated Apr. 27, 2022 issued in counterpart application No. 10-2018-0000081, 11 pages.
European Search Report dated Jan. 3, 2023 issued in counterpart application No. 18898748.1-1001, 4 pages.

* cited by examiner

S1110: (a)

S1120: (a) − (b) ⇒ (c)

S1130: (c) − (d) ⇒ (e)

HIGH-PERFORMANCE MULTILAYER FILM FOR PACKAGING

PRIORITY

This application is a National Phase Entry of International Application No. PCT/KR2018/008575, which was filed on Jul. 27, 2018, and claims priority to Korean Patent Application No. 10-2018-0000081, which was filed in the Korean Intellectual Property Office on Jan. 2, 2018, the content of each of which is incorporated herein by reference.

TECHNICAL FIELD

This disclosure relates to an electronic device and a control method therefor and, more specifically, to an electronic device for determining a type and concentration of gas by using a gas sensor in which gas sensitivity is changed according to an environment (for example, temperature, electrical or physical input, or the like) and a control method therefor.

BACKGROUND

A gas sensor is a device for measuring the concentration of a specific gas, and is provided in a device such as an air purifier and used to measure contaminants.

The gas sensor includes a semiconductor gas sensor, a contact combustion type sensor, an electrochemical sensor, or the like, according to a measurement principle. Among these, in the semiconductor gas sensor, resistance changes as a material subject to measurement adsorbed on a surface of the gas sensor is oxidized or reduced, and an amount of gas is measured by using a degree of change in the resistance.

Since most of the gas except an inert gas has an oxidation/reduction tendency, the target gas to be measured by the semiconductor gas sensor, as well as other gases present therewith, are also detected together. Therefore, the gas sensor was merely able to measure the concentration of the total gas reacted with the gas sensor, and there was a problem in that it is not discernable what kind of and how much gas exists.

DISCLOSURE

Technical Problem

The disclosure is to address the above-described problems, and an object of the disclosure is to provide an electronic device for determining the type and concentration of gas by using a gas sensor in which gas sensitivity is changed according to an environment (e.g., temperature, electrical or physical input, etc.) and a control method thereof.

Technical Solution

An electronic device according to an embodiment includes a gas sensor having different sensitivities in temperature for each of a plurality of gases and a processor configured to calculate a concentration of at least one of a plurality of gases based on an output value of the gas sensor for different temperature sections.

The electronic device further includes a heater configured to vary temperature of a gas sensor, and the processor is configured to control the heater to vary temperature of the gas sensor.

The electronic device further includes a memory configured to store a plurality of temperature control information corresponding to each of a plurality of gases, and the processor is configured to control the heater based on temperature control information corresponding to a gas to be measured.

The processor is configured to control the heater to operate at a constant reference temperature, and based on a predetermined event being sensed, control the heater so that temperature of the gas sensor varies based on temperature control information corresponding to a predetermined gas.

The predetermined event is an event in Which an inflection point is sensed in an output value of the gas sensor or an event in which a predetermined user command is input.

The predetermined gas has a plurality of types, and the processor is configured to, based on the predetermined event being sensed, perform a temperature control cycle to sequentially apply plurality of temperature control information corresponding to each of the plurality of types of gases.

The processor is configured to perform a plurality of times of the temperature control cycle, and calculate a concentration of each of the plurality of types of gases based on an output value of a gas sensor in each cycle.

The processor is configured to, based on controlling of the heater on the basis of temperature control information corresponding to the preidentified gas being completed, control the heater to operate at the reference temperature.

The processor is configured to control the heater based on first temperature control information corresponding to a first gas, and calculate a concentration of the first gas based on an output value of the gas sensor while the heater is being controlled based on the first temperature control information, and control the heater based on second temperature control information corresponding to a second gas different from the first gas, and calculate a concentration of the second gas based on an output value of the gas sensor while the heater is being controlled based on the second temperature control information.

The processor is configured to, based on controlling of the heater based on the first temperature control information being completed, control the heater so as to be maintained at a predetermined constant temperature during a predetermined stabilization time, and based on the predetermined stabilization time being elapsed, control the heater so that temperature varies based on the second temperature control information.

The electronic device further includes a display, and the processor is further configured to display a type of a gas of which concentration is calculated and information on the calculated concentration through the display.

The electronic device further includes a filter configured to filter air; and a fan configured to supply external air to the filter, and the processor is configured to a rotation speed of the fan based on the calculated concentration.

The electronic device further includes a memory storing an output value of the gas sensor, and the processor is configured to generate compression data that is compressed based on a change amount of the stored output value.

A control method of an electronic device comprising a gas sensor having different sensitivities in temperature for each of a plurality of gases includes obtaining an output value of the gas sensor for different temperature sections and calculating a concentration of at least one of the plurality of gases based on the obtained output value.

The electronic device includes a heater, and the control method may further include controlling the heater to vary temperature of the gas sensor.

The electronic device may store a plurality of temperature control information corresponding to each of a plurality of gases and the controlling may include controlling the heater based on temperature control information corresponding to a gas to be measured.

The controlling may include controlling the heater so that the gas sensor operates at a constant reference temperature, and based on a preset event being sensed, controlling the heater so that the temperature of the gas sensor varies based on the temperature control information corresponding to a pre-identified gas.

The predetermined event is an event in which an inflection point is sensed in an output value of the gas sensor or an event in which a predetermined user command is input.

The predetermined gas has a plurality of types, and the controlling may include, based on the predetermined event being sensed, performing a temperature control cycle to sequentially apply plurality of temperature control information corresponding to each of the plurality of types of gases.

The controlling may include, based on controlling of the heater on the basis of temperature control information corresponding to the preidentified gas being completed, controlling the heater to operate at the reference temperature.

The controlling may further include displaying a type of a gas of which concentration is calculated and information on the calculated concentration.

The control method according to an embodiment may further include storing an output value of the gas sensor and generating a compression data that compresses the data based on a change amount of the stored output value.

DETAILED DESCRIPTION OF EXEMPLARY EMBODIMENTS

Figure 1A:
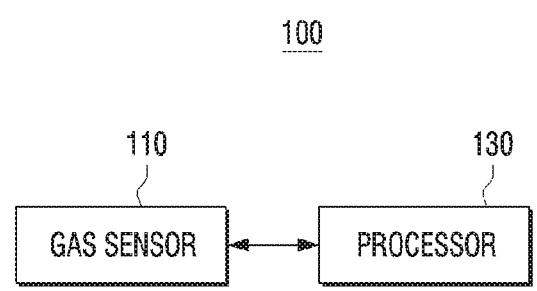
FIGS. 1A and 1B are block diagrams illustrating a configuration of an electronic device according to various embodiments.

In the following description, a detailed description of known functions or configurations incorporated herein will be omitted as it may make the subject matter of the disclosure unclear. The terms described below may be defined in consideration of the functions of the disclosure, and may vary depending on the user, the intention or the relationship of the operator, or the like. Therefore, the definitions should be made based on the contents throughout this specification.

The terms such as "first," "second," and so on may be used to describe a variety of elements, but the elements should not be limited by these terms. The terms are used only for the purpose of distinguishing one element from another.

The terms used herein are used merely to describe a particular embodiment, and are not intended to limit the scope of the claims. The singular forms include plural referents unless the context clearly dictates otherwise. In this application, the terms "comprises" or "consisting of" are intended to specify the presence of stated features, numbers, steps, operations, components, parts, or combinations thereof, and should be understood not to preclude the presence or addition of one or more other features or numbers, steps, operations, components, parts, or combinations thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

Hereinafter, with reference to the attached drawings, embodiments will be described in detail so that those skilled in the art to which the disclosure belongs to can easily make and use the embodiments. This disclosure may, however, be embodied in many different forms and should not be construed as limited to the embodiments set forth herein. In the drawings, the description of the disclosure with reference to the drawings is omitted, and like reference numerals refer to like parts throughout the specification.

The disclosure will be further described with reference to drawings.

FIG. 1A is a block diagram illustrating a configuration of an electronic device 100 according to an embodiment.

Referring to FIG. 1A, the electronic device 100 includes a gas sensor 110 and a processor 130.

The electronic device 100 may be implemented in various types of devices. For example, the electronic device 100 may be embodied in the form of an appliance such as an air purifier, a dehumidifier, an air conditioner, a refrigerator, a washing machine, a kimchi refrigerator, a cleaner, or the like, and may also be embodied in a wearable type, such as a smart watch, patch, glove, band, necklace, bracelet, ring, head band, earphone, earring, clothing, or the like. The electronic device 100 may also be implemented as a gas sensing device itself.

The gas sensor 110, when exposed to gas, includes gas reactive material of which electric or physical property changes.

As a gas-sensitive material, for example, $SnO_2$, $ZnO$, $WO_3$, $TiO_2$, $In_2O_3$, $Pd$, $Fe_2O_3$, $ThO_2$, $AlN$, $ZrO_2$, $CoO$, $LaAlO_3$, $Co_3O_4$, $NiO$, $CuO$, and other semiconductor materials may be used, but is not limited thereto. A noble metal catalyst may be further added to the gas-sensitive material. The catalyst may improve not only the sensitivity and reaction rate, but also selectivity for a specific gas. In addition, for adjusting resistance and improving selectivity, stability, or the like, oxides may be added.

Figure 2:
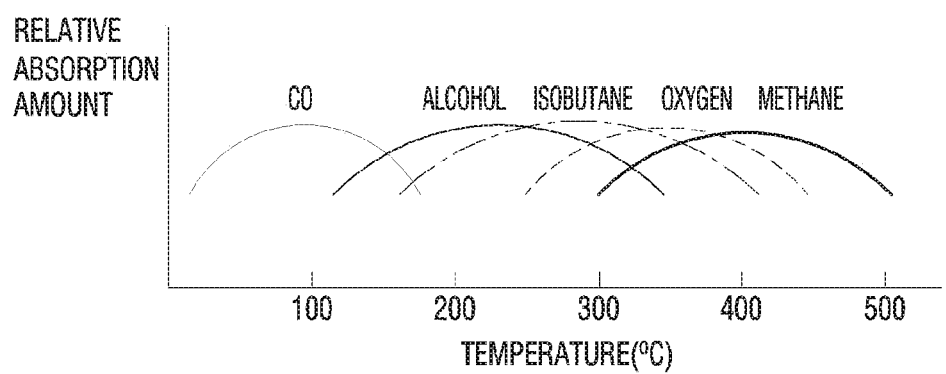
FIG. 2 is a diagram illustrating that sensitivity of a specific gas sensor is different by gases according to temperature.

The gas-sensitive material may have different sensitivity depending on the temperature for each gas. For example, as shown in FIG. 2, the sensitivity of each gas-sensitive material may vary in accordance with temperature. In this disclosure, a kind of gas and the concentration of each gas may be identified using a property that the sensitivity of the gas sensor 110 is changed according to the temperature.

The gas sensor 110 may be made in a bulk type, formed in a form of a thick film on a substrate through a screen printing method or formed in a thin film on a substrate by a chemical vapor deposition method, a sputtering method, a sol-gel method, or the like. The electronic device 100 may include an electrode that outputs a change in electrical conductivity at the gas sensor 110 as an electrical signal. For example, tungsten, silver, platinum, gold, and the like may be used as the material of the electrode. The electrode may be divided into a measuring electrode, an electrode co-used for a heater, and the electrode may be formed of, for example, and a transparent electrode.

The processor 130 is configured to control overall operations of the electronic device 100.

The processor 130 may include at least one central processing unit (CPU), a random access memory (RAM), a read-only memory (ROM), and a system bus. The processor 130 may be implemented as, for example, micro-computer (MICOM), an application specific integrated circuit (ASIC), or the like.

In the gas sensor 110, sensitivity of each of different types of gases may vary according to a change in temperature, and the processor 130 may calculate concentration of at least one of a plurality of gases based on an output value of the gas sensor 110 for different temperature sections.

Figure 1B:
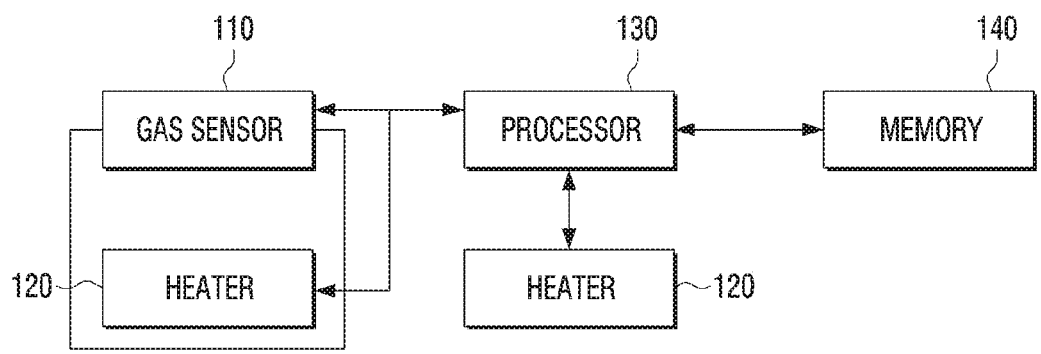

According to an embodiment, as illustrated in FIG. 1B, the electronic device 100 may include at least one heater 120 for varying the temperature of the gas sensor 110, and the processor 130 may control the heater 120 to change the temperature of the gas sensor 110.

For example, the heater 120 may include an electrical resistor and the gas sensor 110 may be heated in such a way that heat is generated by applying a voltage to the resistor. The processor 130 may vary the temperature of the heater 120 by varying the voltage applied to the heater 120.

The heater 120 may be, for example, a platinum heater, a graphene heater (transparent), a chemical-coated type, or the like.

In FIG. 1B, an embodiment in which the heaters 120 are disposed in both inside and outside of the gas sensor 110 has been illustrated, but an embodiment in which the heater 120 is disposed only in one of the inside and outside of the gas sensor 110 is available.

In the embodiments described below, the heater 120 controlled by the processor 130 may refer to a heater inside the gas sensor 110 or a heater outside the gas sensor 110, or a heater inside and outside the gas sensor 110.

In FIG. 10B, it has been described that one heater 120 is disposed inside or outside the gas sensor 110, but a plurality of heaters may be present inside or outside the gas sensor 110.

In the case where the heater 120 is disposed in the gas sensor 110, the heater may be disposed inside the gas sensor 100 of the bulk type, or the heater may be formed in the form of a pattern on the substrate on which the gas sensor 110 in the form of a film is formed. The processor 130 may be electrically connected to a heater inside the gas sensor 110 to control the heater.

When the heater 120 is disposed outside the gas sensor 110, the heater 120 may be disposed in proximity to the gas sensor 110 to facilitate varying the temperature of the gas sensor 110. The processor 130 may vary the temperature of the gas sensor 110 by controlling the heater 120 disposed outside the gas sensor 110.

According to another embodiment, the temperature of the gas sensor 110 may be varied by a separate heater not included in the electronic device 100, and the electronic device 100 may include a temperature sensing device (not shown) for sensing the temperature of the gas sensor 110. In this case, the processor 130 may identify the temperature section according to the sensing result of the temperature sensing device, and the processor 130 may calculate the concentration of the gas based on the output value of the gas sensor 100 in each temperature section.

According to one embodiment, the processor 130 may control the temperature of the heater based on the temperature control information. Specifically, the electronic device 100 may include the memory 140 that stores a plurality of temperature control information corresponding to each of a plurality of different gases. The memory 140 may be implemented as, for example, a non-volatile memory, a volatile memory, a flash memory, a hard disk drive (HDD), or a solid state (hive (SSD). Alternatively, the memory may be implemented as an external storage medium, for example, a micro secure digital (SD) card, a universal serial bus (USB) memory, as well as a storage medium within the electronic device 100.

The processor 130 may control the heater 120 based on the temperature control information corresponding to the gas subject to measurement stored in the memory 140.

The temperature control information corresponding to a particular gas (hereinafter referred to as the first gas) may include, for example, information about the magnitude of the voltage to be applied to the heater 120 for a predetermined time. Specifically, the predetermined time is divided into a plurality of sections, and each section may have different time interval, and the magnitude of the voltage to be applied to the heater 120 for each section may be set differently. The magnitude or the difference in magnitude of the voltage to be applied to the heater 120 for each section may be identified based on the relative sensitivity of the gas sensor 110 according to the temperature of the detectable gases.

Figure 3:
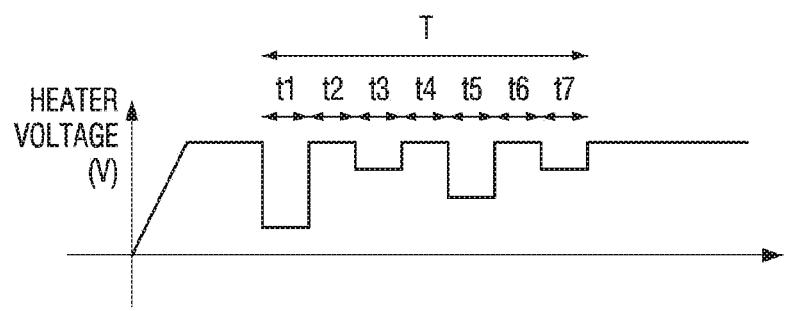
FIGS. 3-5 are diagrams illustrating examples of temperature control information.

Referring to FIG. 3, for example, the temperature control information corresponding to the first gas includes information on the magnitude of the voltage to be applied to the heater 120 for a predetermined time (T). The predetermined time T is divided into a plurality of sections $t_1$, $t_2$, $t_3$, $t_4$, $t_5$, $t_6$ and $t_7$, and a magnitude of a voltage to be applied to the heater 120 for each section may be set. The lengths of each section may be equal or different from each other, and the magnitude of voltages of each section may be different from each other, or some sections may be the same.

Figure 4:
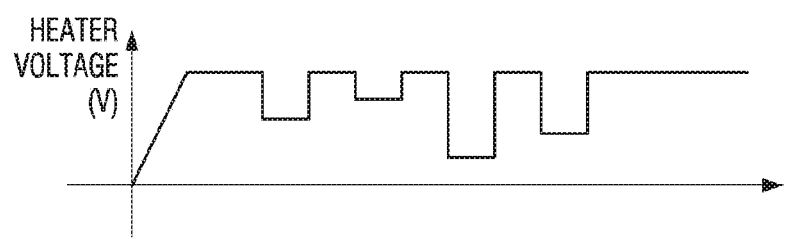
Figure 5:
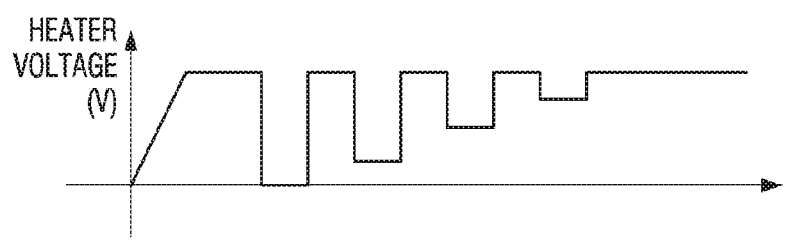

The temperature control information for each gas may be set to be different from each other. For example, the temperature control information corresponding to the first gas may be set as shown in FIG. 3, and the temperature control information for the second gas different from the first gas may be set as shown in FIG. 4, and the temperature control information for the third gas different from the first gas and the second gas may be set as shown in FIG. 5.

The temperature control information on a new gas may be additionally stored in the memory 140. For example, the electronic device 100 described in FIGS. 1A and 1B may download the temperature control information for a new gas from the outside.

The processor 130 may control the heater 120 based on the temperature control information and calculate concentration of at least one of a plurality of gases based on an output value of the gas sensor 110 for different temperature sections.

According to an embodiment, the processor 130 may calculate concentration of each of the plurality of different types of gases by sequentially applying the temperature control information corresponding to the plurality of different types of gases.

For example, the processor 130 may control the heater 120 based on the first temperature control information corresponding to the first gas, calculate the concentration of the first gas based on an output value of the gas sensor 110 while the heater 120 is controlled based on the first temperature control information, control the heater 120 based on the second temperature control information corresponding to the second gas different from the first gas, and calculate the concentration of the second gas based on the output value of the gas sensor 110 while the heater 120 is controlled based on the second temperature control information.

In this case, after controlling the heater 120 based on the first temperature control information corresponding to the first gas, the heater 120 may be controlled by applying the second temperature control information corresponding to the second gas. Alternatively, the heater 120 may be controlled by applying the second temperature control information after having time to stabilize the temperature of the gas sensor 110, instead of controlling the heater 120 by applying the second temperature control information corresponding to the second gas immediately after controlling the heater 120 based on the first temperature control information corresponding to the first gas. Having a time for stabilization is desirable to obtain a more accurate output value.

Accordingly, when the heater 120 is controlled based on the first temperature control information, the processor 130 may control the heater 120 to maintain a predetermined temperature for a predetermined stabilization time, and control the heater 120 so that the temperature may vary based on the second temperature control information when the preset stabilization time elapses.

Figure 6:
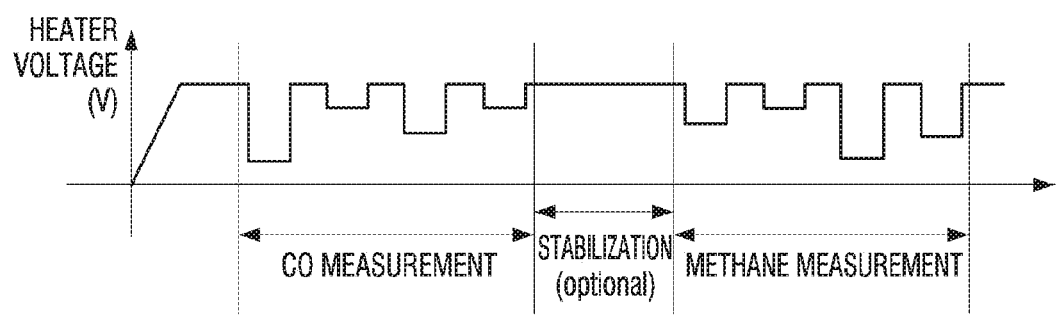
FIG. 6 is a diagram illustrating a control method of a heater by an electronic device according to an embodiment.

Referring to FIG. 6, when the concentration of carbon monoxide and methane is to be measured, the processor 130 may control the heater 120 by sequentially applying temperature control information corresponding to carbon monoxide (CO) and temperature control information corresponding to methane, and measure a gas corresponding to the temperature control information applied in a section controlled by the respective temperature control information. In this case, in order to stabilize the gas sensor 110 before changing to measurement of methane gas after the carbon monoxide measurement is completed, the processor 130 may control the heater 120 to a predetermined temperature for a predetermined time. The stabilization time is not mandatory and is optionally applicable.

According to an embodiment, the processor 130 may control the heater 120 to maintain the heater 120 at a constant reference temperature at normal times and to vary the temperature based on temperature control information corresponding to the predetermined gas when a specific event occurs. The predetermined gas may be arbitrarily designated as a hazardous gas, such as a gas of interest, such as formaldehyde, toluene, ethylbenzene, or the like.

According to an embodiment, it is possible to reduce the power consumption of the electronic device 100 and extend the lifetime of the gas sensor 110 by separately measuring the concentration of the gas by varying the temperature only if necessary, without performing an operation to measure concentration of gases at normal times.

The predetermined event may be, for example, an event at which an inflection point occurs at the output value of the gas sensor 110 while the heater 120 is operating at a reference temperature. The inflection point refers to a point in which the increase or decrease of the output value is changed, and may indicate that the increase or decrease of the gas is detected by the gas sensor. While operating at a reference temperature, the concentration of the gas sensed by the gas sensor 110 may be identified, but it is not possible to grasp what kind of gas is sensed at what concentration. Even if which gas is unknown, a situation in which gas is increasing hints the occurrence of an abnormal situation, by performing a measurement operation with respect to a gas of interest, such as a hazardous gas, it may be identified as to whether the hazardous gas is present with how much concentration. After viewing the measurement result of the electronic device 100, the user may open the door for ventilation. By allowing to identify how much gas, such as hazardous gas, is present in the situation where the gas is reduced, it is possible for the user to confirm that the hazardous gas has been reduced as intended.

As another example, the predetermined event may be to receive a command to measure a concentration of a particular gas from a user. The electronic device 100 may include an inputter (e.g., a button) for receiving a user input, or may include a communicator capable of wirelessly receiving a user command from a user terminal (e.g., a cell phone) and if a user command to measure the concentration of a particular gas is input through the configuration, the processor 130 may control the heater 120 such that the temperature is varied based on temperature control information corresponding to the particular gas. The user may manually specify the gas to be measured. Alternatively, the gas to be measured may be preset by default in the electronic device 100, in which case the electronic device 100 may operate to automatically measure the predetermined gas, for example, only by pressing a particular button of the electronic device 100.

Figure 7:
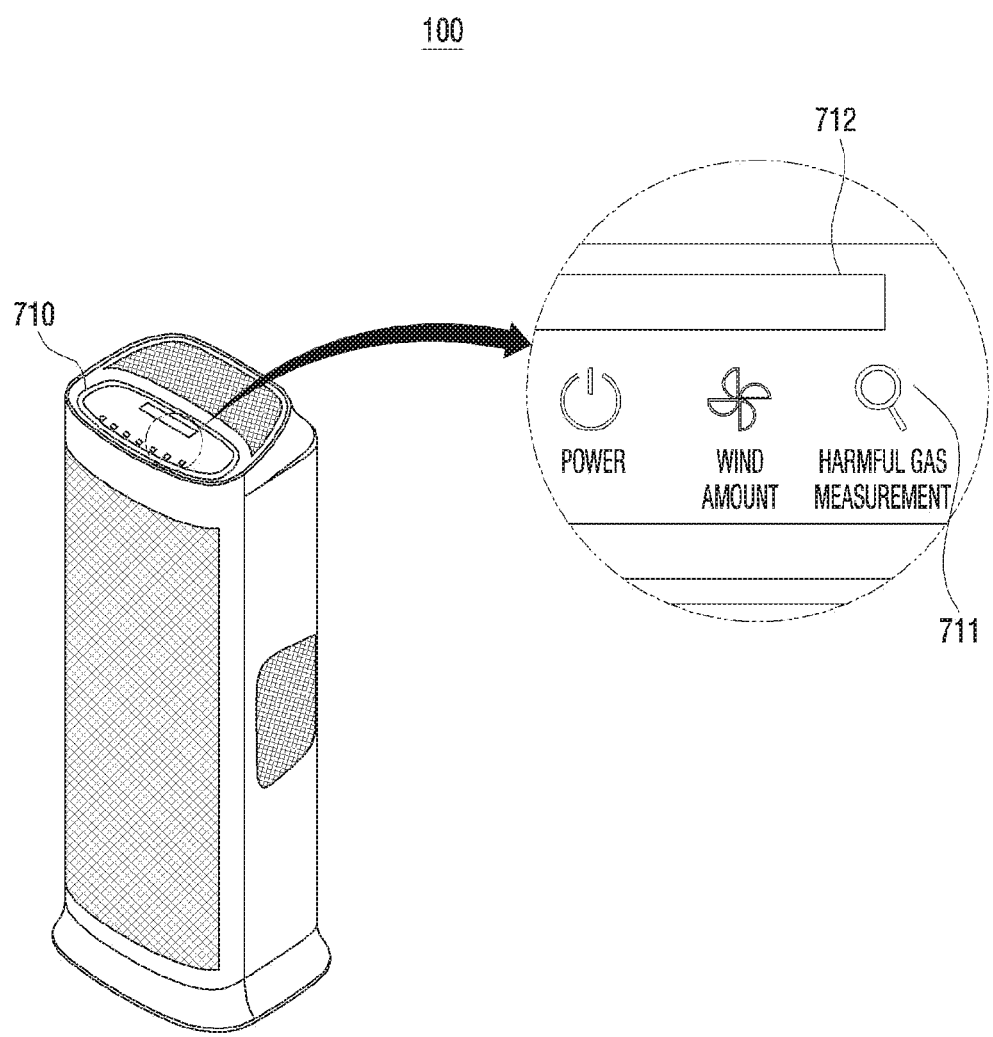
FIGS. 7-8 are diagrams illustrating various embodiments of receiving a user command for measuring gas by an electronic device.

FIG. 7 is a diagram illustrating various embodiments of receiving a user command for measuring gas by the electronic device 100.

Referring to FIG. 7, the electronic device 100 may be implemented as an air purifier and may include an inputter 710. The inputter 710 may include various buttons for receiving a user input, and may include a harmful gas measurement button 711. If the user selects the harmful gas measurement button 711, a gas measurement operation with respect to a predetermined gas such as formaldehyde, toluene, and ethylbenzene may be performed. That is, the processor 130 may control the heater 120 with temperature control information corresponding to formaldehyde, toluene, and ethylbenzene, respectively, and display the concentration of each gas on, for example, a display 712.

Figure 8:
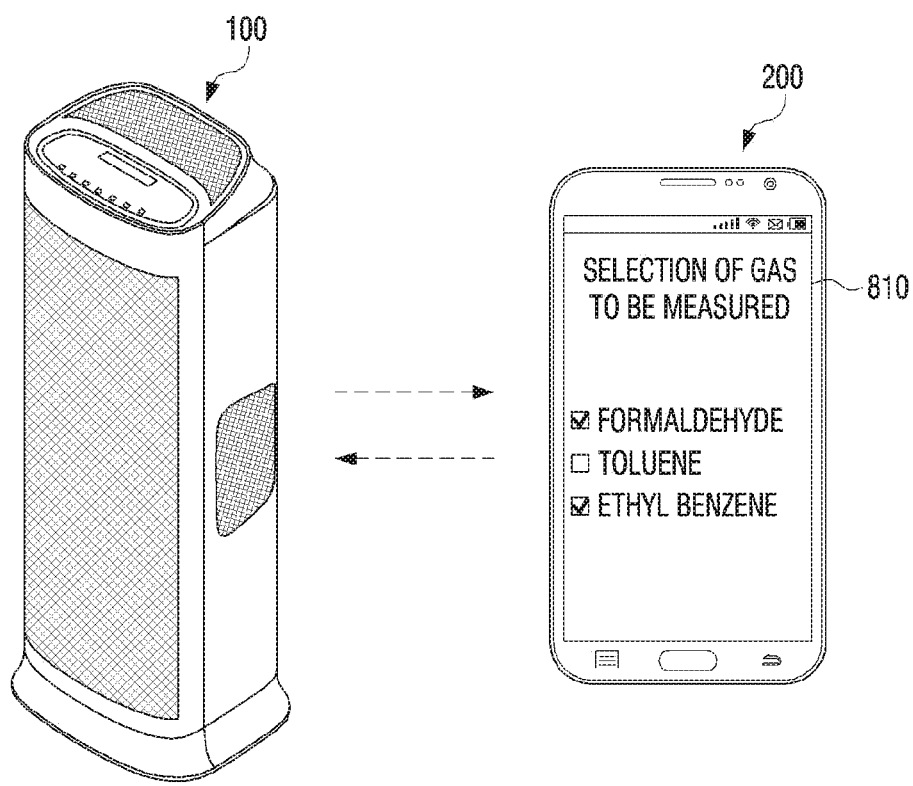

FIG. 8 is a diagram illustrating an embodiment of receiving a user command for measuring a specific gas concentration by another electronic device communicatively connected to the electronic device 100.

Referring to FIG. 8, the electronic device 100 may be implemented with an air purifier and may communicate with an external device. For example, the electronic device 100 may include a communicator capable of performing communication such as Wi-Fi, Bluetooth, and near field communication (NFC), or the like. The electronic device 100 may receive a user command from a user terminal device 200 through the communicator and perform a control operation according to the user command. The user terminal device 200 may display a user interface (UI) 810 for selecting a gas to be measured based on receiving information about the gas measurable from the electronic device 100, and if the information on the gas selected in the UI 810 is transmitted to the electronic device 100, the electronic device 100 may perform an operation to measure the concentration of the selected gas based on the temperature control information corresponding to the selected gas.

In the above-described embodiments, when a predetermined event is detected while the heater 120 is being controlled with a reference temperature, the gas to be measured may be one type or may be a plurality of types. If the predetermined gas is a plurality of gases, the processor 130 may perform a temperature control cycle in which a plurality of temperature control information corresponding to each of the plurality of gases is sequentially applied when a predetermined event is detected.

Figure 9:
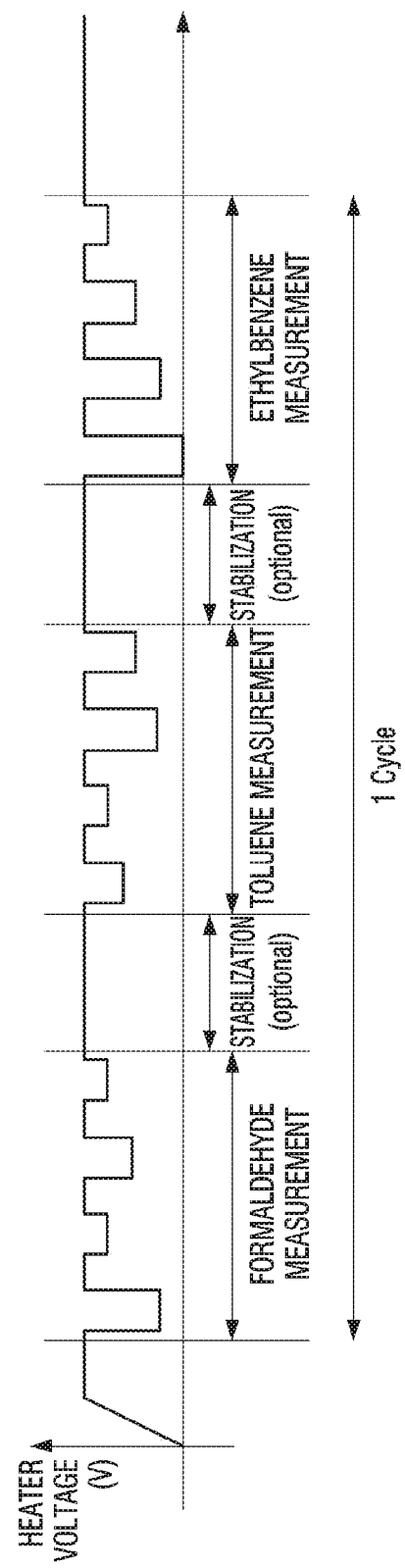
FIG. 9 is a diagram illustrating a temperature control cycle according to an embodiment.

Referring to FIG. 9, when the gas to be measured at the occurrence of a predetermined event is formaldehyde, toluene, and ethylbenzene, if a predetermined event occurs while the heater 120 is controlled to a predetermined reference temperature, the processor 130 may control the heater 120 based on the temperature control information corresponding to the formaldehyde to calculate the concentration of the formaldehyde, and after controlling the heater 120 based on the a preset certain temperature during the predetermined stabilization time, and then control the heater 120 based on the temperature control information corresponding to the toluene to calculate the concentration of toluene, and after controlling the heater 120 to a predetermined certain temperature, control the heater 120 based on the temperature control information corresponding to the ethylbenzene to calculate the concentration of ethylbenzene. In FIG. 9, it has been described that the reference temperature and a certain temperature during the stabilization time are the same, but they may be different. The stabilization time is not essential.

The processor 130 may perform a plurality of temperature control cycles using one temperature control cycle to control the heater 120 with a plurality of control information corresponding to a plurality of types of gases. That is, referring to FIG. 9, once one cycle of measuring formaldehyde, toluene, and ethylbenzene is completed, the cycle of measuring formaldehyde, toluene, and ethyl benzene may be performed again. One cycle may take about five to ten seconds, but this is an example only and may take a variety of times.

The processor 130 may perform a plurality of temperature control cycles and calculate a concentration of each of the plurality of gases based on an output value of the gas sensor in each cycle. For example, the processor 130 may average the concentration of gas measured during a plurality of cycles to calculate a concentration.

The processor 130 may control the heater 120 to operate at the reference temperature again when the heater control is completed based on the temperature control information corresponding to the predetermined gas. That is, referring to FIG. 9, when the cycle is completed with the measurement of ethyl benzene as the last one, the processor 130 may control the heater 120 to operate again at the reference temperature.

The processor 130 may calculate the concentration of the gas to be measured based on an output value of the gas sensor 110 while the heater 120 is being controlled based on the temperature control information corresponding to the gas to be measured.

For example, in the memory 140, information on relative sensitivity (or relative absorption amount) of the gas sensor 110 according to temperature by sensible gases, and the processor 130 may calculate a concentration of the gas to be measured by analyzing an output value of the gas sensor 110 by a plurality of temperature sections.

Assuming that FIG. 3 corresponds to the temperature control information of the gas to be measured, the processor 130 may control the heater 110 based on temperature control information corresponding to the gas to be measured, and may obtain an output value of the gas sensor 110 in $t_1$ section, an output value of the gas sensor 110 in $t_2$ section, an output value of the gas sensor 110 in a $t_3$ section, an output value of the gas sensor 110 in an $t_4$ section, an output value of the gas sensor 110 in an $t_5$ section, an output value of the gas sensor 110 in an $t_6$ section, and an output value of the gas sensor 110 in an $t_7$ section. Since the output value of each section reflects influence of other gases as well as the gas to be measured, only the output value of one section cannot calculate the concentration of the gas to be measured, but the memory 140 stores information on the relative sensitivity of the gas sensor 110 with respect to the gas to be measured and other gases at temperatures corresponding to each of the plurality of sections $t_1$, $t_2$, $t_3$, $t_4$, $t_5$, $t_6$, and $t_7$, the processor 130 may identify an output value according to the influence of the gas to be measured based on the information and the output value of each section, and consequently the concentration of the gas to be measured may be calculated.

According to still another embodiment, the memory 140 stores data of an output value of the gas sensor 110 when the electronic device 100 operates with specific temperature control information in an environment where single gas is present, and the processor 130 may identify a type of the gas based thereon.

For example, the memory 140 may store first data for output values for each temperature section when only the first gas is present when the electronic device 100 operates with specific temperature control information, second data for output values for each temperature section when only the second gas is present when the electronic device 100 operates with specific temperature information, and third data for output values for each temperature section when only the third gas is present when the electronic device 100 operates with specific temperature information. The data may be composed of ratio information on the output values for each temperature section.

If an output value of the gas sensor 110 for each temperature section is obtained by controlling the heater 120 based on the specific temperature control information, the processor 130 may calculate the ratio information of the output values for each temperature section, and compare the information with the data stored in the memory 140 to identify the type of gas. According to one embodiment, the processor 130 may normalize the output values for each temperature section to obtain ratio information and identify the type of gas. In addition, the processor 130 may calculate the magnitude information of the signal to calculate the concentration of the gas. The magnitude information may be calculated by normalizing the preset reference value with the output values for each temperature section.

Specifically, the output value for each temperature section of the gas sensor 110 and the predetermined reference value are normalized to obtain ratio information of the output value and the magnitude information of the signal. The predetermined reference value may be set to a maximum range value of the sensor output, or may be set to a difference between a maximum value and a minimum value among the actual output values.

Figure 10:
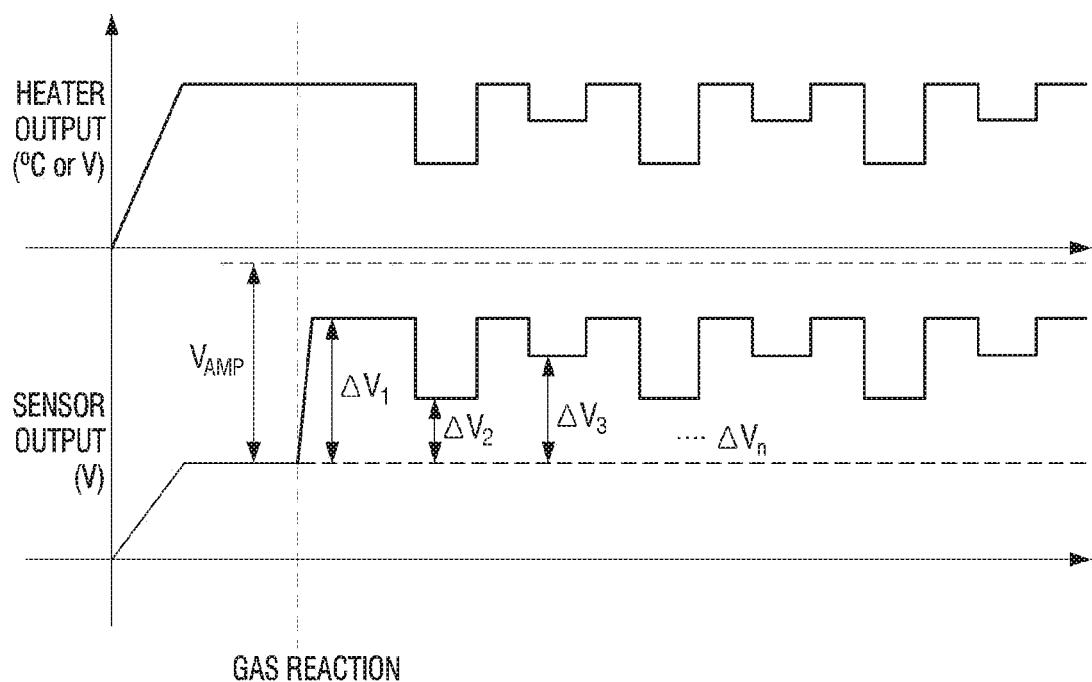
FIG. 10 is a diagram illustrating a method of normalizing an output value of a gas sensor according to an embodiment.

As illustrated in FIG. 10, the output value of the gas sensor 110 may be $\Delta V_1$, $\Delta V_2$, $\Delta V_3$, . . . $\Delta V_3$, and the reference value may be set to $V_{amp}$, which is the maximum range value of the sensor output.

For example, when the reference value is set to $V_{amp}=3$, if the output value is $\Delta V_1=0.7$, $\Delta V_2=0.2$, and $\Delta V_3=0.5$, it may be normalized as shown in the following Table 1, and when the output value is $\Delta V_1=0.1$, $\Delta V_2=0.5$, and $\Delta V_3=0.7$, it may be normalized as shown in Table 2 below. The normalization value may be calculated by dividing each value by the sum of all values. The normalization value 0.68 of the $V_{amp}$ represents information about the signal magnitude of the output values in Table 1, and the normalization value 0.70 of the $V_{amp}$, represents information about the signal magnitude of the output values in Table 2.

TABLE 1

|  | $\Delta V_1$ | $\Delta V_2$ | $\Delta V_3$ | $V_{amp}$ |
| --- | --- | --- | --- | --- |
| Output value | 0.7 | 0.2 | 0.5 | 3 |
| Normalization value | 0.16 | 0.05 | 0.11 | 0.68 |

TABLE 2

|  | $\Delta V_1$ | $\Delta V_2$ | $\Delta V_3$ | $V_{amp}$ |
| --- | --- | --- | --- | --- |
| Output value | 0.1 | 0.5 | 0.7 | 3 |
| Normalization value | 0.02 | 0.12 | 0.16 | 0.70 |

Although the information on the ratio of the output values may be obtained when normalizing with only the output values, the information on the magnitude of a signal is not known, but information on the magnitude of a signal may be known according to the above-described embodiment. The type of gas may be determined with information on the ratio of the output values, and the concentration of the gas identified based on the information on the magnitude of a signal may be calculated. According to an embodiment, a process for correcting the effects of temperature and humidity may be performed. For example, the memory 140 may additionally store data for temperature and humidity correction, and the electronic device 100 may further include a temperature sensor and a humidity sensor. The processor 130 may correct the output value of the gas sensor 110 based on the sensed value measured through the temperature sensor and the humidity sensor and the data for temperature and humidity correction to identify the type of gas based on the corrected output value and calculate the concentration.

According to a still another embodiment, the electronic device 100 may receive, from an external server, peripheral information such as regional information, temperature information, humidity information, pressure information, or the like, of a place where the electronic device 100 is located, and may correct an output value based thereon.

According to an embodiment, the pattern formed by the output values of the gas sensor 110 may be compared with the pattern formed by the output values of the gas sensor 110 at a specific gas of a specific concentration, which is known in advance, so as to identify which and how much gas is currently present. Here, the pattern refers to information on the ratio of output values when the gas sensor 110 is operated at predetermined temperatures.

According to an embodiment, the pattern of output values described above may be seen through a regression equation for the output value of the gas sensor 110 according to the concentration obtained through the experiment. This regression may be stored in the memory 140 and used. The regression equation will be described with reference to FIG. 11A.

Figure 11A:
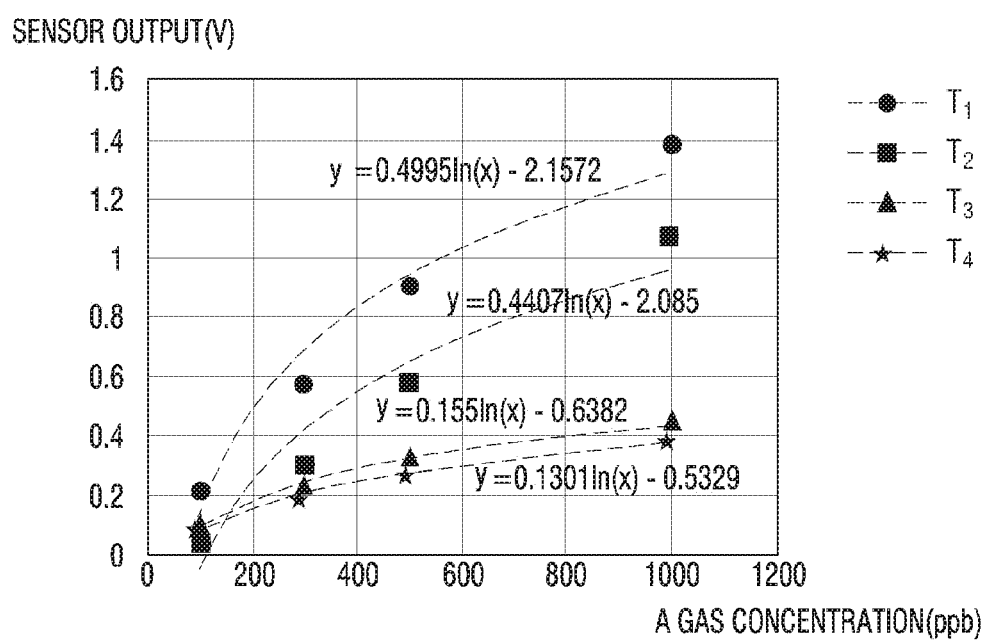
FIGS. 11A to 11C are diagrams illustrating various embodiments of detecting each of individual gases in composite gas.

FIG. 11A is a diagram illustrating an embodiment of deriving a regression equation. FIG. 11A illustrates a regression equation of the output value of the gas sensor 110 according to the concentration of the gas A at each temperature, when the temperatures of the gas sensor 110 is T1, T2, T3, and T4.

Specifically, when the temperature of the gas sensor 110 is set to T1 and the gas A is present at a concentration of 100 ppb, 300 ppb, 500 ppb, and 1000 ppb, the output values (shown as circular points) of the gas sensor 110 may be obtained, and the regression equation may be calculated based on the output values. In the case where the temperature of the gas sensor 110 is T2, T3, and T4, the regression equation may be calculated in a similar manner. The regression equations for gases other than the gas A may be obtained through the above-described method.

The memory 140 may store a database of regression equations for each gas, and the processor 130 may search for a pattern similar to the pattern formed by the output values output by the gas sensor 110 from the database, and identify which and how much gas is currently present. According to one embodiment, it is possible to individually detect each gas through pattern comparison in a situation where various kinds of gases are mixed.

Specifically, a method of repeating a process of subtracting a pattern of a single gas similar to a pattern of output values obtained in an environment in which various kinds of gases are mixed may be used. For example, the processor 140 may obtain an output value of the gas sensor 110 for different temperature sections, identify a plurality of gases corresponding to the obtained output values by sequentially subtracting the pre-stored output values corresponding to each of the plurality of gases from the obtained output values, and calculate the concentration of the identified gas types. The embodiment will be described with reference to FIG. 11B.

Figure 11B:
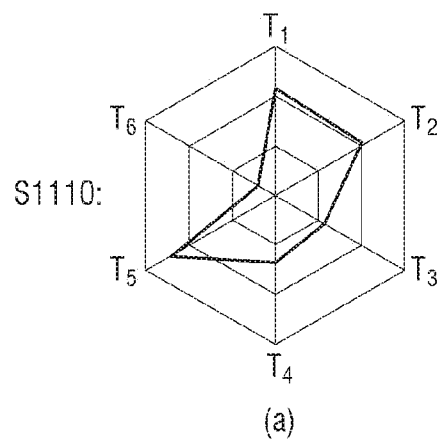
Figure 11B:
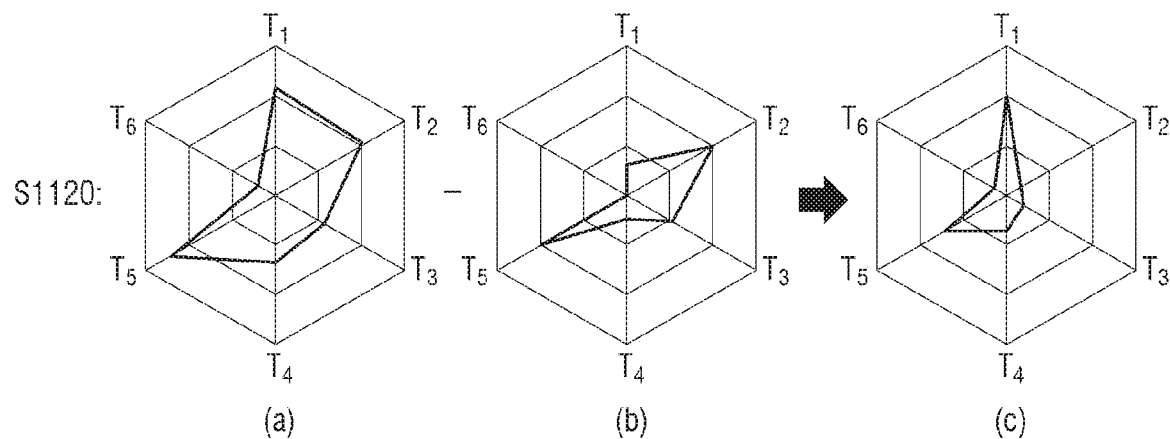
Figure 11B:
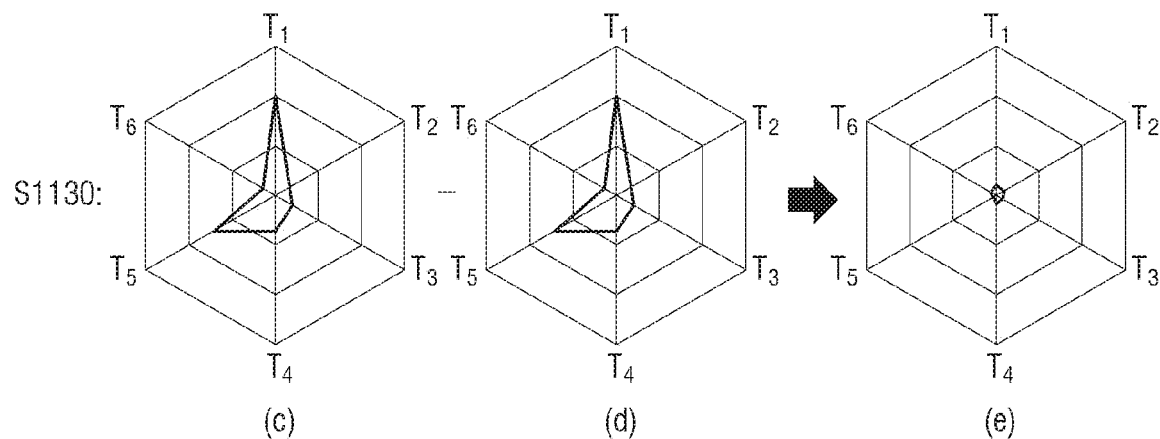

FIG. 11B is a diagram illustrating an embodiment of dividing and detecting each gas in an environment where several types of gases are mixed, that is, in a mixed gas environment.

Referring to FIG. 11B, the processor 140 drives the gas sensor 110 at predetermined temperatures to obtain output values (a) at each temperature in operation S1110. The exemplary pre-set temperatures of FIG. 11B are $T_1$, $T_2$, $T_3$, $T_4$, $T_5$, and $T_6$, and the output values at each temperature are shown in the graph of a hexagon.

The processor 140 searches for the output values (b) that form the pattern most similar to the pattern of the output values (a) from the database stored in the memory 140. For example, if the temperature of the gas sensor 110 is $T_1$, $T_2$, $T_3$, $T_4$, $T_5$, and $T_6$, regression equations for the corresponding formaldehyde are stored, and the output values (b) may be output values when the formaldehyde obtained on the basis of the regression equations is 300 ppb.

The processor 140 obtains the residual output values (c) by deducting the output values (b) from the output values (a) in operation S1120.

The processor 140 searches for the output values (d) that form the pattern most similar to the pattern of residual output values (c) from the database stored in the memory 140. For example, if the temperature of the gas sensor 110 is $T_1$, $T_2$, $T_3$, $T_4$, $T_5$, and $T_6$, regression equations for the corresponding ethylbenzene are stored, and the output values (d) may be output values when the ethylbenzene obtained on the basis of the regression equations is 200 ppb.

The processor 140 obtains residual output values (e) by deducting the output values (d) from the output values c) in operation S1130. If the residual output values (e) is ignorable (less than or equal to a preset value), a gas detection process is terminated.

The processor 140 may output information indicating that 300 ppb of formaldehyde and 200 ppb of ethylbenzene are present. The information may be output through a display 712 provided in the electronic device 100, referring to FIG. 7, or transmitted to a user terminal device 200 connected to the electronic device 100, referring to FIG. 8, and output from the user terminal device 200.

Figure 11C:
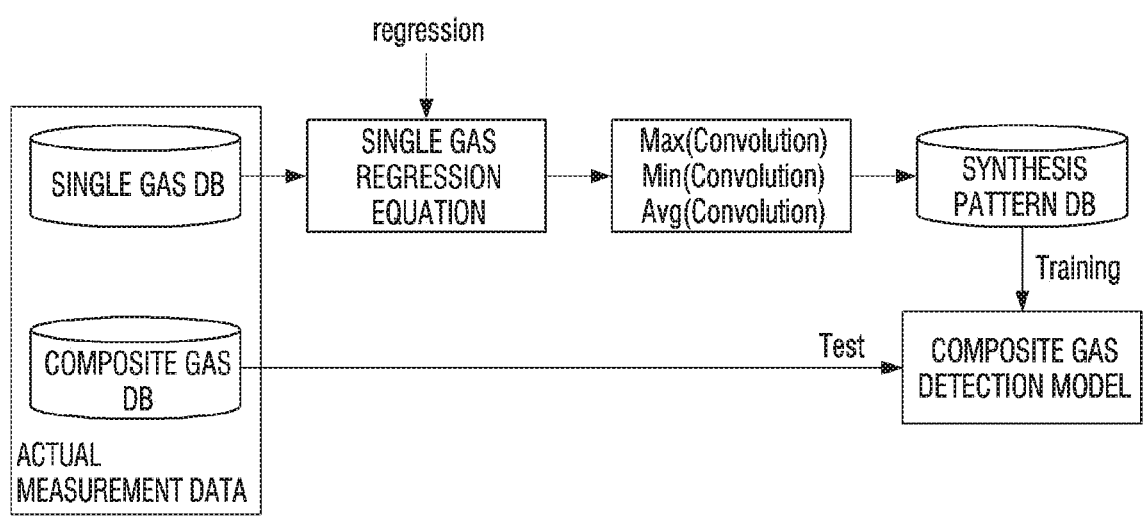

FIG. 11C is a diagram illustrating still another embodiment of individually detecting each gas in an environment where composite gas exists.

Referring to FIG. 11C, a synthesis pattern database may be generated by synthesizing a regression equation of a single gas that may be obtained in the manner described with reference to FIG. 11A above. Individual gases may be detected using the learned composite gas detection model based on the generated database. The composite gas detection model may be modified and complemented based on the actually-measured data base in the composite gas environment.

The composite gas may be analyzed by using at least one method in the embodiment of FIG. 110B and the embodiment of FIG. 11C.

According to the embodiments as described above, several types of gases may be identified respectively, and the concentrations of the identified gases may be grasped individually.

Figure 12:
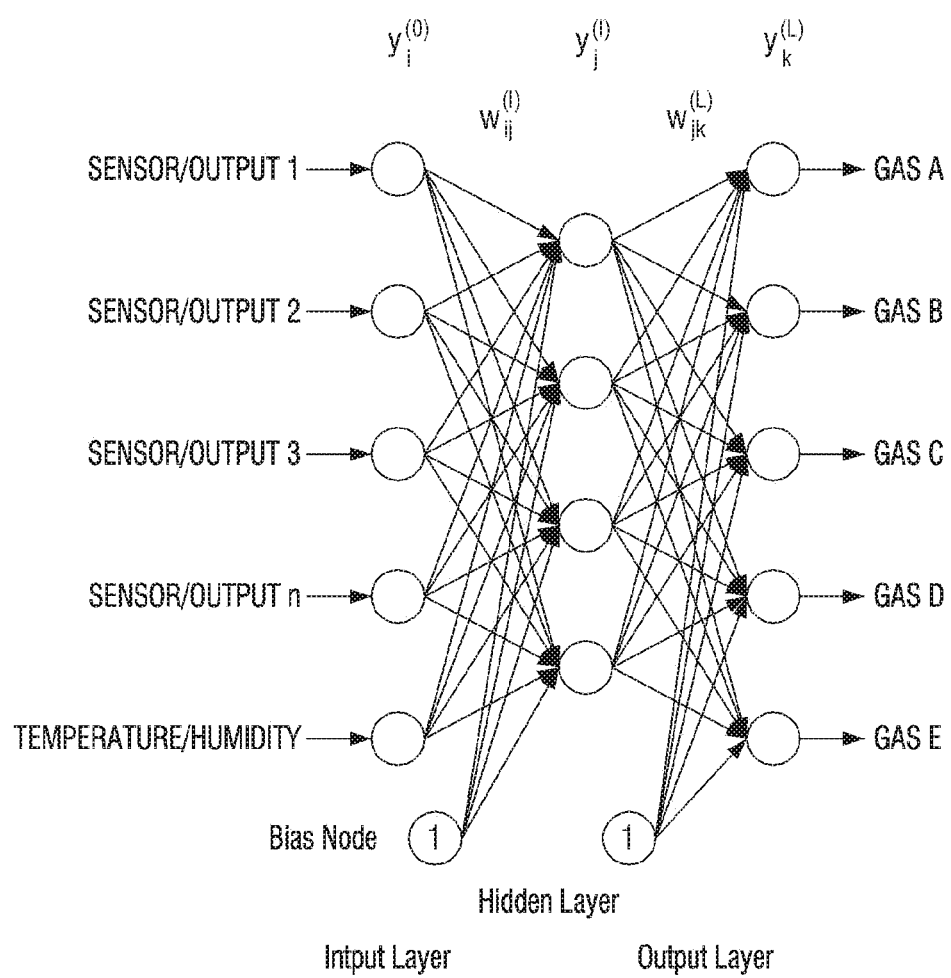
FIG. 12 is a diagram illustrating a machine learning method of an electronic device according to an embodiment.

FIG. 12 is a diagram illustrating a machine learning method of an electronic device according to an embodiment. Specifically, the processor 130 may perform operations via machine learning based on a pre-stored database of data. In this case, various algorithms using the neural network may be used, and a backpropagation algorithm may be used for the learning of the neural network algorithm. Specifically, the error of a hidden layer is calculated by using the error generated in an output layer for learning of the hidden layer. This value is again propagated back to the input layer so that the error in the output layer may be repeated until the desired level is reached. Through the machine learning process, the accuracy of gas sensing may be increased.

According to one embodiment, the electronic device 100 may further include a display and the processor 130 may display information about the type and concentration of the detected gas through the display. For example, as illustrated in FIG. 9, when the measurement of formaldehyde, toluene, and ethylbenzene is completed, the concentration information of formaldehyde, the concentration information of toluene, and the concentration information of ethylbenzene may be displayed through a display. The display may be implemented with a light-emitting diode (LED), a liquid crystal display (LCD), or the like. The display may be implemented in the form of a touch screen.

If the electronic device 100 is implemented with an air purifier, the electronic device 100 may further include a filter for filtering air and a fan for providing external air to the filter.

The filter is configured to filter air to provide clean air and may include one or more filters of various types, for example, a pre-filter, a high efficiency particulate air (HEPA) filter, a deodorizing filter, a photocatalytic filter, or the like.

The fan is a configuration so that external air that is introduced into the inside of the air purifier passes through the filter and then is output to the outside again.

The processor 130 may control the speed of rotation of the fan based on the concentration of the particular gas calculated based on the output value of the gas sensor 110. That is, by controlling the speed of rotation of the fan, the rate of air inflow into the air purifier may be controlled.

For example, if the type of gas and the concentration thereof are in a level that is harmless to the human body, the processor 130 may control so that the fan does not rotate or the fan rotates at a preset speed, and if the type of gas and the concentration thereof are in a level harmful to the human body, the processor 130 may control the fan to rotate at a speed faster than the preset speed.

As another example, if the number of fans is plural, the processor 130 may control the flow rate of air by controlling the number or type of fans to be driven based on the type of gas and the concentration thereof. In the related art, even when a gas (food odor, etc.) harmless to the human body is generated, an air purifier is unnecessarily operated, and there has been significant power consumption. However, according to the embodiments described above, power consumption may be reduced as an unnecessary operation may not be performed by grasping the type and concentration of the gas.

As another example, the air purifier may operate in a plurality of modes, each of which may be a plurality of modes for filtering different types of gases. Specifically, various filters suitable for various types of gases may be provided inside the electronic device 100 implemented with an air purifier, and the processor 130 may identify a filter to be operated according to the type and concentration of the measured gas. For example, the processor 130 may control a flow path of the air purifier so that air is introduced into only a specific filter according to the type of gas, thereby removing the corresponding gas. Accordingly, only the filter suitable for the target of removal may be operated and thus, the operating life of the filter may be increased, and this is economical in terms of maintenance and repair.

As another example, the processor 130 may control the direction of air intake to the air purifier based on the type and concentration of the gas of which concentration has been calculated. For example, if the type of the gas is a harmful gas from a floor material, such as formaldehyde, of a newly-constructed apartment, and the concentration thereof is in a level harmful to the human body, the processor 130 may control the air inflow direction of the air purifier so that air may be introduced from the floor.

The electronic device 100 may further include a communicator for communicating with another electronic device. The communicator may be connected to an external device through a wireless communication (for example, Z-wave, internet protocol version 4(IPv4) over low-power wireless personal area networks (4LoWPAN), radio frequency identification (RFID), long-term evolution device to device (LTE D2D), Bluetooth low energy (BLE), general packet radio service (CPRS), Weightless, Edge Zigbee, ANT +, near field communication (NFC), infrared data association (IrDA), digital enhanced cordless telecommunications (DECT), wireless local area network (WLAN), Bluetooth, WiFi, Direct, global system for mobile communications (GSM), universal mobile telecommunications system (UNITS), long-term evolution (LTE), wireless broadband (WiBRO), cellular (3/4/5G), ultra, or the like) as well as local area network (LAN) and an Internet network.

The processor 130 may transmit a control command generated based on the type and concentration of the detected gas to at least one other electronic device through the communicator. The other electronic device may be, for example, a danger alarm device, a window automatic opening/closing device, a ventilation device, or the like. The other electronic device may be a display device, such as a smartphone or a television (TV), and the processor 130 may transmit, to the display device, a control command to display information about the type and concentration of the detected gas. For example, a screen including a description of the gas and information about an action that the user should take (for example, window opening or a ventilator running) may be displayed on the display device.

According to an embodiment, the processor 130 may store the output value of the gas sensor 110 in the memory 140, and the processor 130 may generate the compression data which compresses the data based on a change amount of the stored output value.

The processor 130 may obtain the data of a portion having a large amount of change in the output value of the gas sensor 120 in a concentrated manner, and obtain the data of a portion where the change amount is maintained at a certain level at a minimum level that is capable of regression analysis. For example, the processor 130 may extract the data when a slope of the output value is increased, decreased, or the inflection point is detected at the output value, or the slope of the output value is zero.

Figure 13:
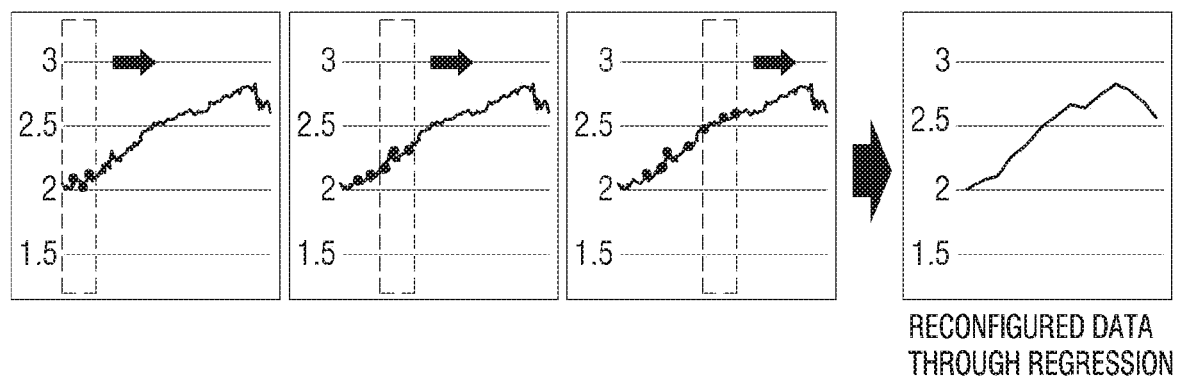
FIG. 13 is a diagram illustrating a data compression method of an electronic device according to an embodiment.

Referring to FIG. 13, the processor 130 may extract an output value of a specific point according to a slope change amount of an output value while moving a window of a preset size to the output value and generate compressed data composed of the extracted data. The processor 130 may store the compressed data in the memory 140 and, optionally, transmit the data to the external device. The external device may be, for example, an Internet of things (IoT) hub that manages the electronic device 100 and other devices. The electronic device 100 and the external device may reconstruct the data via regression analysis on the compressed data.

According to an embodiment, the data collected for a long time may be efficiently managed through compression and the calculation amount and operation time may be significantly reduced.

Figure 14:
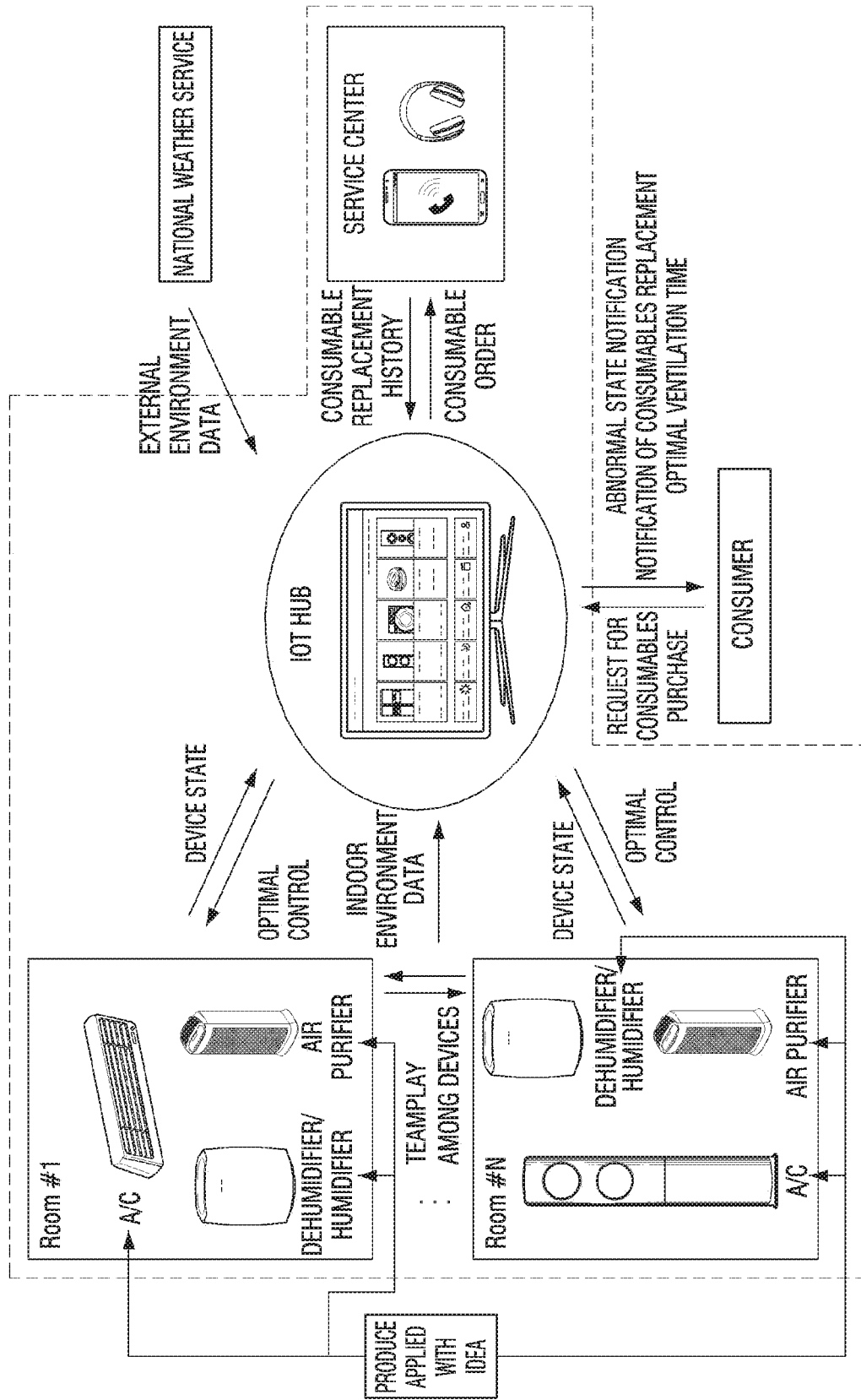
FIG. 14 is a view illustrating an Internet of Things (IoT) system including an electronic device according to an embodiment.

As illustrated in FIG. 14, the electronic device 100 according to the embodiments may be implemented with various devices such as an air purifier, a dehumidifier, a humidifier, an air conditioner, or the like, and may be connected to the IoT hub to provide various services to a user. The IoT hub may be implemented as a specific device in a home appliance, and may be implemented, for example, as a user's mobile phone, a TV, or the like. The IoT hub may also be connected to a service center, and may be connected to the national weather service to receive environmental information for harmful gases such as, for example, fine dust, ozone, carbon monoxide, nitrogen dioxide, sulfite gas, or the like, to control each device in a household to an optimal state based on the received information. In addition the devices shown in FIG. 14, for example, a humidifier, a smart window, an air purifier, a circulator, a hood, or the like, may also be controlled.

Figure 15:
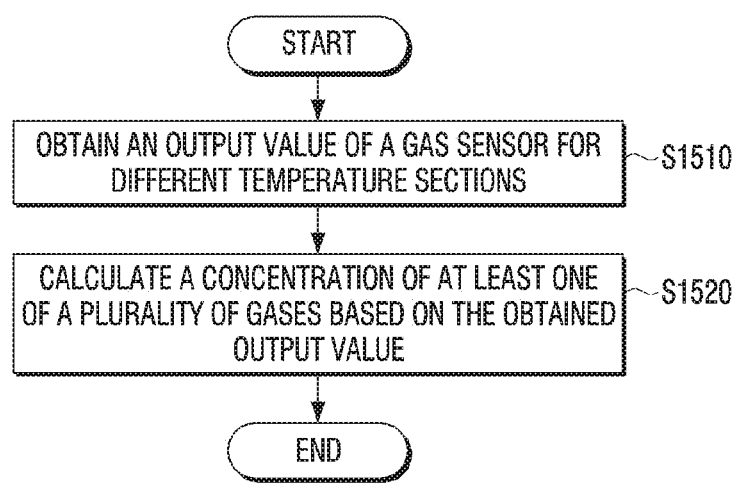
FIG. 15 is a flowchart to describe a control method of an electronic device according to an embodiment.

FIG. 15 is a flowchart illustrating a method of controlling an electronic device according to an embodiment including a gas sensor having different sensitivities for each of a plurality of gases. The flowchart shown in FIG. 15 may be configured with operations that are processed in the electronic device 100 described herein. Accordingly, even if omitted below, the description described with respect to the electronic device 100 may also be applied to the flow chart shown in FIG. 15.

Referring to FIG. 15, the output value of the gas sensor for different temperature sections is obtained in operation S1510.

If the electronic device includes a heater that varies the temperature of the gas sensor, then prior to operation S1510, controlling the heater to change the temperature of the gas sensor may be performed. For example, the electronic device may pre-store a plurality of temperature control information corresponding to each of the plurality of gases, and may control the heater based on temperature control information corresponding to the gas to be measured among the plurality of stored temperature control information. The temperature of the gas sensor may be changed through the heater control, and the output value of the gas sensor at differ temperature sections may be obtained.

The temperature control information may include information about the electrical characteristics (e.g., voltage, current, resistance, etc.) or temperature over time. According to an embodiment, the temperature control information may be deleted, added, and updated through machine learning.

The heater may be controlled to operate at the reference temperature at normal times, and if a preset event is detected during the reference temperature, the temperature may be controlled to be variable based on the temperature control information corresponding to a predetermined gas.

The preset event may be an event in which the inflection point is sensed in the output value of the gas sensor or an event in which a preset user command is input.

The predetermined gas may be a plurality of gases, and if a predetermined event is detected, a temperature control cycle may be performed to sequentially apply a plurality of temperature control information corresponding to the plurality of gases. In this case, the temperature control cycle may be performed multiple times and the concentration of each of the multiple species may be calculated based on the output value of the gas sensor in each cycle.

When controlling the heater based on the temperature control information corresponding to the predetermined gas is completed, the heater may be controlled to operate at the reference temperature again.

The electronic device calculates a concentration of at least one of a plurality of gases based on an output value of the gas sensor for different temperature sections in operation S1520.

For example, the heater may be controlled on the basis of the first temperature control information corresponding to the first gas, the concentration of the first gas may be calculated based on the output value of the gas sensor while the heater is controlled based on the first temperature control information, the heater may be controlled based on the second temperature control information corresponding to the second gas different from the first gas, and the concentration of the second gas may be calculated based on the output value of the gas sensor while the heater is controlled based on the second temperature control information.

In this case, when control of the heater based on the first temperature control information is completed, the heater may be controlled so that the heater is maintained at a predetermined temperature for a predetermined stabilization time, and the heater may be controlled so that the temperature may be varied based on the second temperature control information when the preset stabilization time elapses.

It is also possible that the concentration of a gas is calculated in another device by delivering an output value of the gas sensor from the electronic device to another device instead of calculating a concentration of a gas directly by the electronic device.

The electronic device may display information about the type and concentration of gas detected through the display of the electronic device. Alternatively, the electronic device may be communicatively coupled to an external display device, so as to display information on the type and concentration of the gas through an external display device.

According to an embodiment, the electronic device may store an output value of the gas sensor in the memory 140, generate compressed data based on a change amount of the stored output value, enable efficient management of the memory by storing the data in the form of compressed data, and increase transmission efficiency when transmitting data to an external server or the like. The compressed data may include information about a distinct change amount at the output value, and based on the information, it is possible for the compressed data to be reconstructed again.

Figure 16:
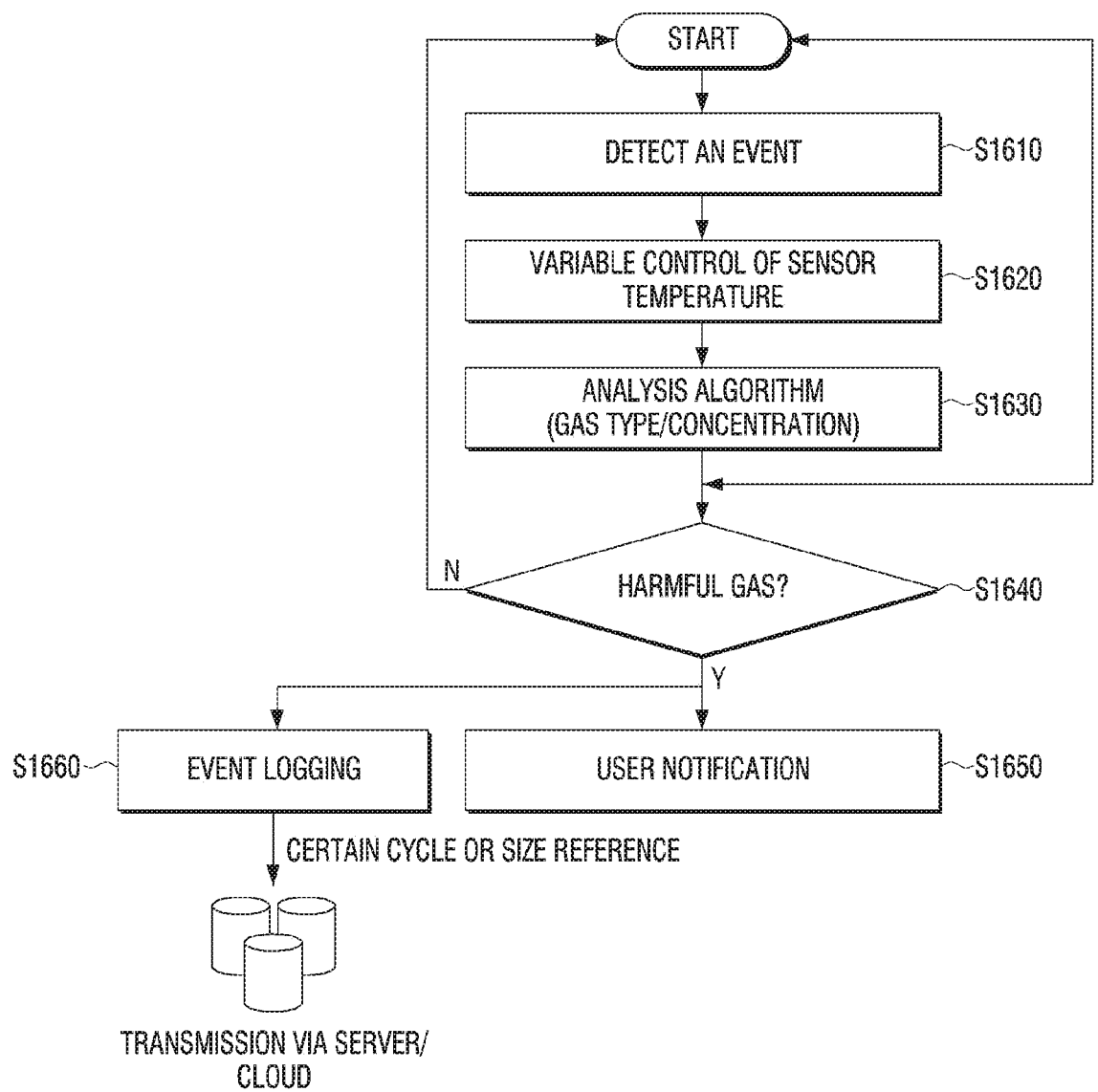
FIG. 16 is a flowchart illustrating a control method of an electronic device according to still another embodiment.

FIG. 16 is a flowchart illustrating a method of controlling the electronic device according to another embodiment. The flowchart shown in FIG. 16 may be configured with operations that are processed in the electronic device 100 described herein. Accordingly, the disclosure described with respect to the electronic device 100 may also be applied to the flow chart shown in FIG. 16, although omitted below.

Referring to FIG. 16, the occurrence of a preset event is detected in operation S1610 For example, the preset event may be an event in which the inflection point is detected at an output value of the gas sensor or an event in which a preset user command is input.

If the preset event is detected, the temperature of the gas sensor is controlled in operation S1620, and the type and concentration of the gas is identified by applying the analysis algorithm in operation S1630. For example, the output value of the gas sensor for different temperature sections may be compared with pre-stored data corresponding to each of the plurality of gases to determine at least one type of gas corresponding to the output value. The data may include information about a ratio of output values previously measured at different temperature sections for a particular concentration of a particular gas.

In operation S1640, by determining whether the type of the determined gas is a harmful gas in operation S1640, a function to notify a user may be performed in operation S1650. For example, the alarm function may be performed in a manner that displays, for example, via a display of the electronic device, or an alarm function may be performed in a manner that transmits to an external device (e.g., a mobile device such as a smartphone or the like. Then, the event is logged in operation S1660. In this case, the identification information of the electronic device, the location information of the electronic device, the information on the output value of the gas sensor, the type of gas identified according to the output value, the information about the concentration, or the like, may be transmitted to the server or the cloud. The transmission time point of this information may be set at a certain period, or may be determined according to the size of the information to be transmitted.

According to the embodiments described above, the concentration may be measured by dividing various gas types by using one gas sensor, and effective control of gas sensing data is possible.

In the embodiments above, a method of differentiating temperatures of one gas sensor to make sensitivities different has been described, but a method of using a plurality of gas sensors having different sensitivities can also be included in the disclosure.

The various embodiments described above may be implemented in a non-transitory computer-readable recording medium, which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor itself. According to a software implementation, embodiments such as the procedures and functions described herein may be implemented with separate software modules. Each of the above-described software modules may perform one or more of the functions and operations described herein.

Computer instructions for performing the processing operations in the electronic device 100 according to various embodiments described above may be stored in a non-transitory computer-readable medium. The computer instructions stored in the non-transitory computer-readable medium, when executed by a processor of a particular device, cause the particular device to perform a processing operation in the electronic device 100 according to various embodiments described above.

For example, a non-transitory computer-readable medium having a program for performing a control method of an electronic device including a gas sensor having different sensitivities for each of a plurality of gases and a heater for varying the temperature of the gas sensor may be provided, wherein the control method may include operations of controlling a heater to change the temperature of the gas sensor; and calculating a concentration of at least one of the plurality of gases based on the output value of the gas sensor for different temperature sections.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

According to embodiments, a method disclosed herein may be provided in software of a computer program product. A computer program product may be traded between a seller and a purchaser as a commodity. A computer program product may be distributed in the form of a machine readable storage medium (e.g., CD-ROM) or distributed online through an application store (e.g., PlayStore™). In the case of on-line distribution, at least a portion of the computer program product software may be stored temporarily or at least temporarily in a storage medium such as a manufacturer's server, a server in an application store, or a memory in a relay server.

The foregoing example embodiments and advantages are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic device comprising:
   a gas sensor having different sensitivities in temperature for types of a plurality of gases;
   a heater configured to vary temperature of the gas sensor;
   a memory configured to store temperature control information corresponding to the types of a plurality of gases; and
   a processor configured to:
      in response to a preset event related to change of an output value of the gas sensor having occurred, control the heater based on first temperature control information corresponding to a first gas, and obtain a concentration of the first gas based on an output value of the gas sensor while the heater is being controlled based on the first temperature control information, and
      control the heater based on second temperature control information corresponding to a second gas different from the first gas, and obtain a concentration of the second gas based on an output value of the gas sensor while the heater is being controlled based on the second temperature control information.

2. The electronic device of claim 1, wherein the preset event is an event in which an inflection point is sensed in an output value of the gas sensor or an event in which a predetermined user command is input.

3. The electronic device of claim 1, wherein:
   the plurality of gases have a plurality of types, and
   the processor is further configured to, based on the preset event being sensed, perform a temperature control cycle to sequentially apply plurality of temperature control information corresponding to each of the plurality of types of gases.

4. The electronic device of claim 3, wherein the processor is configured to perform a plurality of times of the temperature control cycle, and calculate a concentration of each of the plurality of types of gases based on an output value of a gas sensor in each cycle.

5. The electronic device of claim 1, wherein the processor is configured to, based on controlling of the heater on the basis of temperature control information corresponding to the preidentified gas being completed, control the heater to operate at the reference temperature.

6. The electronic device of claim 1, wherein the processor is configured to, based on controlling of the heater based on the first temperature control information being completed, control the heater so as to be maintained at a predetermined constant temperature during a predetermined stabilization time, and based on the predetermined stabilization time being elapsed, control the heater so that temperature varies based on the second temperature control information.

7. The electronic device of claim 1, further comprising:
   a display,
   wherein the processor is further configured to display a type of a gas of which concentration is calculated and information on the calculated concentration through the display.

8. The electronic device of claim 1, further comprising:
   a filter configured to filter air; and
   a fan configured to supply external air to the filter,
   wherein the processor is configured to control a rotation speed of the fan based on the calculated concentration of the at least one gas.

9. The electronic device of claim 1,
   wherein the processor is configured to generate compression data by compressing the output value based on a change amount of the stored output value.

10. A control method of an electronic device comprising a gas sensor having different sensitivities in temperature for types of a plurality of gases and a heater, the method comprising:
    in response to a predetermined event related to change of an output value of the gas sensor having occurred, controlling the heater based on first temperature control information corresponding to a first gas, and obtaining a concentration of the first gas based on an output value of the gas sensor while the heater is being controlled based on the first temperature control information, and
    controlling the heater based on second temperature control information corresponding to a second gas different from the first gas and obtaining a concentration of the second gas based on an output value of the gas sensor while the heater is being controlled based on the second temperature control information.

* * * * *

UNITED STATES PATENT AND TRADEMARK OFFICE
CERTIFICATE OF CORRECTION

| | | |
|---|---|---|
| PATENT NO. | : 11,592,412 B2 | Page 1 of 1 |
| APPLICATION NO. | : 16/763891 | |
| DATED | : February 28, 2023 | |
| INVENTOR(S) | : Jang-pyo Park et al. | |

It is certified that error appears in the above-identified patent and that said Letters Patent is hereby corrected as shown below:

On the Title Page

Item (54) and in the Specification, Column 1, Line 1:
"HIGH-PERFORMANCE MULTILAYER FILM FOR PACKAGING"
Should be:
-- ELECTRONIC DEVICE AND CONTROL METHOD THEREFOR --.

Signed and Sealed this
Twenty-second Day of August, 2023

Katherine Kelly Vidal
*Director of the United States Patent and Trademark Office*